United States Patent [19]

Mulshine et al.

[11] Patent Number: 4,922,370
[45] Date of Patent: * May 1, 1990

[54] AUTOMATICALLY RESETTING CIRCUIT PROTECTOR

[75] Inventors: James P. Mulshine, Pt. Pleasant; Michael J. Sakatos, Union, both of N.J.

[73] Assignee: Inresco, Inc., Manasquan, N.J.

[*] Notice: The portion of the term of this patent subsequent to Mar. 7, 2006 has been disclaimed.

[21] Appl. No.: 320,279

[22] Filed: Mar. 6, 1989

Related U.S. Application Data

[63] Continuation-in-part of Ser. No. 878,358, Jun. 25, 1986, Pat. No. 4,811,153.

[51] Int. Cl.$^5$ .......................... H02H 3/20; H01H 1/66
[52] U.S. Cl. .......................... 361/88; 361/91; 361/102; 361/111; 361/117; 335/151; 335/154
[58] Field of Search ............ 361/33, 88, 120, 117, 361/56, 54, 91, 102, 187, 143, 154, 146; 307/111, 116, 130; 335/154, 151

[56] References Cited

U.S. PATENT DOCUMENTS

| 3,319,128 | 5/1967 | Nilssen | 361/104 |
| 3,736,467 | 5/1977 | Meier et al. | 361/5 |
| 4,811,153 | 3/1989 | Sakatos | 361/91 |

Primary Examiner—Todd E. DeBoer
Attorney, Agent, or Firm—Robert M. Skolnik

[57] ABSTRACT

Circuit protectors employing a reed switch or electro-mechanical switching device, has a primary coil connected in series with it. Two resistors are connected across the switch/device and series connected primary coil. A secondary coil is connected across the load to the juncture of the two resistors. The primary and secondary coils are concentric windings. The switch/device is open when there is no power supplied. Thus, the two resistors and the secondary coil are connected to the load. The values of the two resistors and the secondary coil are chosen so that the coil current increases when the power supply is turned ON. When the load reaches approximately 80% of its full level, the magnetic flux generated by a secondary coil winding is sufficient to cause the switch or device contacts to close. As the load reaches its normal state, the secondary coil continues to hold the contacts closed.

7 Claims, 2 Drawing Sheets

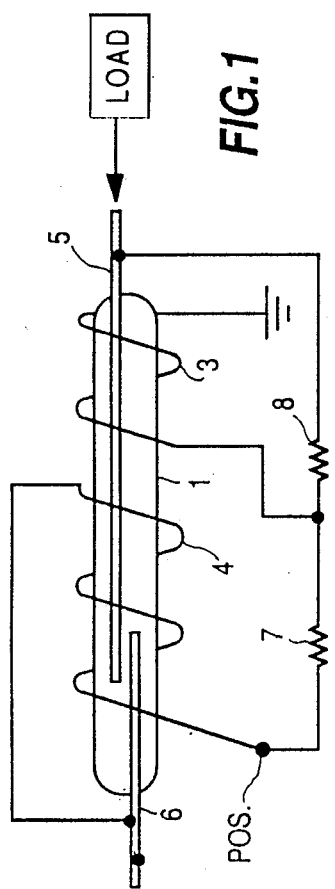
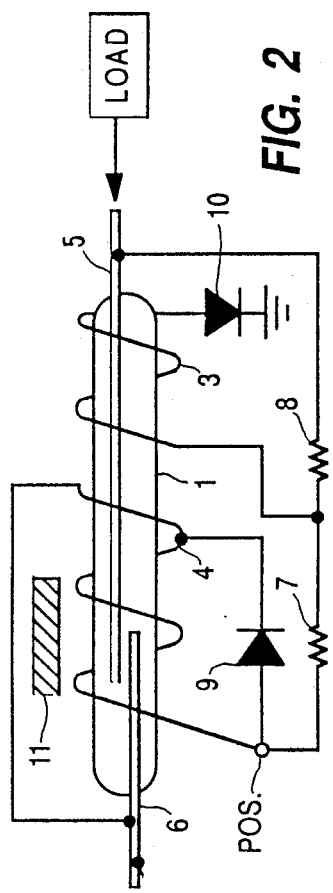

4,922,370

AUTOMATICALLY RESETTING CIRCUIT PROTECTOR

CROSS-REFERENCE TO RELATED APPLICATIONS

This application is a continuation-in-part of U.S. patent application Ser. No. 878,358, filed June 25, 1986 in the name of Michael J. Sakatos, now U.S. Pat. No. 4,811,153, issued Mar. 7, 1989.

FIELD OF THE INVENTION

The present invention protects sensitive electronic circuits from high current overloads and employs switching devices which turn off the load current when an excessive load current level is reached. The invention provides an ability to reset automatically when the overload condition disappears.

DESCRIPTION OF THE PRIOR ART

The aforementioned application of Sakatos Ser. No. 878,358, filed June 25, 1986, now U.S. Pat. No. 4,811,153, issued Mar. 7, 1989, discloses a circuit protection device employing a magnetically responsive reed switch having at least two sources of magnetic bias, one source to initiate the switching of the reeds and the other source to complete the reeds switching and maintain the reeds in the switched state. The current flows through the protector of Sakatos until a predetermined fault condition is reached at which time the magnetic bias is changed to effect switching of the protector.

In a co-pending application of Mulshine and Sakatos, Ser. No. 320,158, filed of even data herewith, the use of an electro-mechanical switching device in lieu of reed switches is disclosed.

SUMMARY OF THE INVENTION

The present invention provides the ability to automatically reset the circuit protector employing either a reed switch or an electro-mechanical switching device when the overload condition disappears. In addition, the present invention provides a soft start-up (i.e. full current is not initially applied), and a trip time in the 15–50 microsecond range. The invention provides improved vibration resistance to inadvertent switching when the reed switch is mechanically jostled. The invention also provided a low voltage drop across the circuit so that there is low power consumed therein. Further, the invention prevents turning ON a system into an overload condition.

In the circuit protectors of this invention, the reed switch and/or the device as the case may be, has a primary coil which is connected in series with the switch/device. Two resistors are connected across the switch/device and series connected primary coil. A secondary coil is connected across the load to the juncture of the two resistors. The primary and secondary coils are concentric windings.

The switch/device is open when there is no power supplied. Thus, the two resistors and the secondary coil are connected to the load. The values of the two resistors and the secondary coil are chosen so that the coil current increases when the power supply is turned ON. In the preferred embodiment, when the load condition reaches approximately 80% of its full level, the magnetic flux generated by a secondary coil winding is sufficient to cause the switch or device contacts to close. As the load reaches its normal state, the secondary coil continues to hold the contacts closed.

With the contacts in the closed position, the primary coil of the reed switch or of the device coil is introduced into the magnetic circuit. The flux thus generated is opposite in polarity to that of the secondary coil. When the load draws more current, the magnetic flux present around the switch/device diminishes until it falls below the minimum amount necessary to maintain contact closure. At this point, the contacts open and the primary coil is no longer providing any magnetic flux. The protector is now considered as being "tripped".

In the "tripped" state, the two resistors are in series with the load and thus limit the current to the load. Most of the supply voltage is across the resistors.

In order to reset itself, the load must increase in resistance (a sign of recovery) so that a higher percentage of the supply voltage will appear across the load while the voltage across the two resistors decreases. When the load reaches approximately 80% of its final level, the switch/device closes and reset is complete.

Additional circuit elements are provided in other embodiments of the invention. We have observed that during very extreme overloads, the primary coil will develop so much extra magnetic flux that there is a risk of reclosure of the switch/device. A diode is placed across the primary coil to limit the voltage drop across the coil by dumping the high overload current until tripping occurs.

For use in both AC and DC circuits, an additional diode placed in series with the secondary coil, and a latching magnet mounted adjacent to the switch are employed.

In this embodiment, the magnet strength is positioned between the pull-in and drop-out ampere turn levels of the switch. The first positive peak that permits the load to reach approximately 80% of its final value, allows the contacts to close. The magnet serves to hold and latch the switch closed while the AC signal is on its negative halfcycle. The diode prevents current flow through the secondary coil inhibiting its effect.

With the switch closed, the primary coil enters the circuit. This coil may be of either the same polarity as the secondary coil or of opposite polarity thereto. With the same polarity, the two coils aid or add together on the positive half-cycle, and no trip can occur. On the negative half-cycle, the secondary coil does not generate flux, so that the flux generated by the primary coil subtracts from the magnet flux to bring the total flux below the drop-out point of the switch, thus tripping the device. The reset mode operates in the same manner as previously described. This embodiment trips on negative half-cycle overloads but not positive half-cycle overloads.

Another embodiment trips on both positive and negative half-cycle overloads. This embodiment combines two of the half-cycle circuits.

The above described embodiments have the primary coil acting in the circuit only when the contacts are closed. Other embodiments of the invention are disclosed so that the primary coil is connected such that it operates with the contacts open. In these embodiments, the resistors are connected across the switch only; not the primary coil.

A principal object of the invention is the provision of a circuit protector which protects sensitive electronic circuits from dangerously high current overloads. An important object of this invention is the provision of a circuit protector which resets automatically when the overload condition is removed. Another object of this invention is the provision of a circuit protector which has a soft start-up. Another object of this invention is the provision of a circuit protector with a trip time in the range of 15 to 50 microseconds. A still further object and advantage of this invention is a circuit protector which has improved resistance to triggering on the occurrence of vibrations. These objects are accomplished in a circuit protector which has low power loss therein.

BRIEF DESCRIPTION OF THE DRAWINGS

These as well as further objects and advantages of the invention will become apparent to those skilled in the art from a review of the following detailed specification reference being made to the accompanying drawings in which:

FIG. 1 is a schematic diagram of the circuit of the invention;

FIG. 2 is a schematic diagram of another circuit according to the invention.

DETAILED DESCRIPTION OF THE INVENTION

Figure 3:
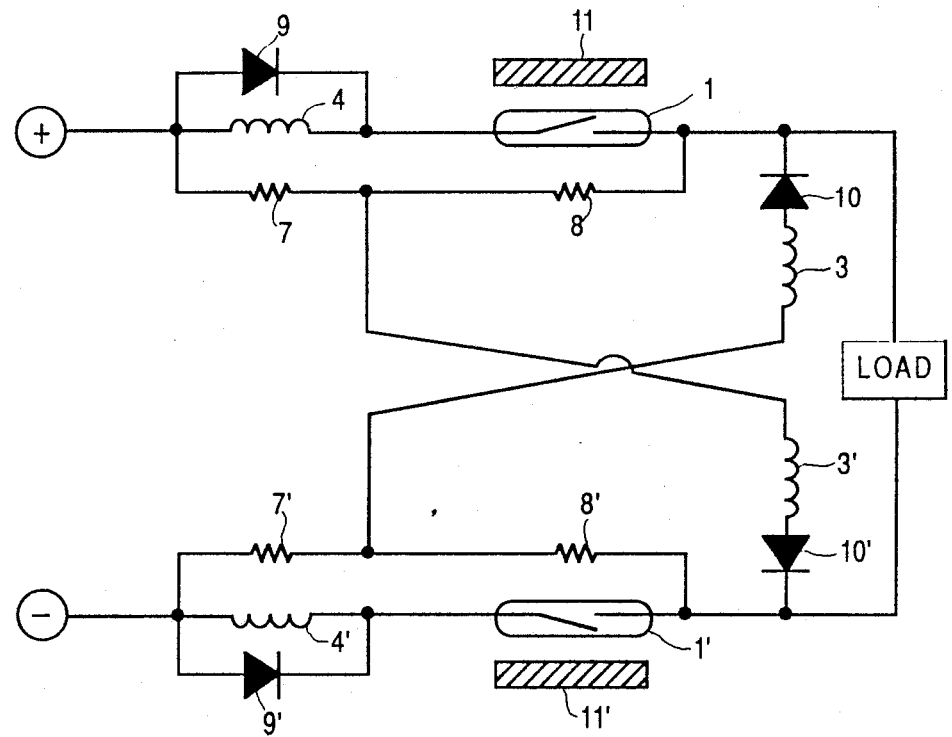
FIG. 3 is a schematic diagram of another embodiment of the invention.

FIG. 1 is a schematic diagram of one embodiment of the invention employing a Form A reed switch 1 and connected as part of an electrical system. In this illustration, winding 4 has one lead connected to one side of the power supply, one side of resistor 7, and the other lead connected to reed 6. Another winding 3 is connected to ground and to the other side of resistor 7. Another resistor 8 is connected between resistor 7 and reed 5. The load is connected to reed 5.

In the circuit protector of FIG. 1, the reed switch 1 has coil 4 as the primary coil connected in series with the reed switch 1. The two resistors 7 and 8 are connected across the switch 1 and the series connected primary coil 4. Coil 3 is the secondary coil connected across the load to the juncture of the two resistors 7 and 8. The primary and secondary coils 4 and 3 are concentric windings.

The switch 1 is open when there is no power supplied. Thus, the two resistors 7 and 8 and the secondary coil 3 are connected to the load. The values of the two resitors 7 and 8 and the secondary coil 3 are chosen so that the coil current increases when the power supply is turned ON. When the normal state reaches approximately 80% of its full level, the magnetic flux generated by secondary coil winding 3 is sufficient to cause the switch 1 to close. As the load reaches its normal state, the secondary coil 3 continues to hold the contacts 7 and 8 closed.

With the contacts 7 and 8 in the closed position, the primary coil 4 of the reed switch 1 is introduced into the magnetic circuit. The flux thus generated by coil 4 is opposite in polarity to that of the secondary coil 3. When the load draws more current, the magnetic flux present around switch 1 until it falls below the minimum amount necessary to maintain contact closure. At this point, the contacts open and the primary coil 4 is no longer providing any magnetic flux. The device is now considered as being "tripped".

In the "tripped" state, the two resistors 7 and 8 are in series with the load and thus limit the current to the load. Most of the supply voltage is across the resistors 7 and 8.

In order to reset itself, the load must increase in resistance (a sign of recovery) so that a higher percentage of the supply voltage will appear across the load while the voltage across the two resistors 7 and 8 decreases. When the load reaches approximately 80% of its final level, the switch 1 closes and reset is complete.

Additional circuit elements are provided in other embodiments of the invention shown in FIG. 2. These additional elements include diodes 9 and 10 and permanent magnet 11 mounted in proximity to reed switch 1 (in the manner described in the aforementioned Sakatos patent 4,811,153).

We have observed that during very extreme overloads, the primary coil 4 will develop so much extra magnetic flux that there is a risk of reclosure of the switch 1. A diode 9 is placed across the primary coil 4 to limit the voltage drop across the coil 4 by dumping the high overload current until tripping occurs.

For use in both AC and DC circuits, an additional diode 10 is placed in series with the secondary coil 3, and a latching magnet 11 is mounted adjacent to the reed switch 1.

In this embodiment, the strength of magnet 11 is positioned between the pull-in and drop-out ampere turn levels of the reed switch 1. The first positive peak that permits the load to reach approximately 80% of its normal value, allows the switch 1 to close. The magnet 11 serves to hold and latch the switch closed while the AC signal is on its negative half-cycle. The diode 10 prevents current flow through the secondary coil 3 inhibiting its effect.

With the switch 1 closed, the primary coil 4 enters the circuit. The coil 4 may be of either the same polarity as the secondary coil 3 or of opposite polarity thereto. With the same polarity, the two coils 3 and 4 aid or add together on the positive half-cycle, and no trip can occur. On the negative half-cycle, the secondary coil 3 does not generate flux, so that the flux generated by the primary coil 4 subtracts from the magnet flux 11 to bring the total flux below the drop-out point of the reed switch 1, thus tripping the device. The reset mode operates in the same manner as previously described. The embodiment of FIG. 2 trips on negative half cycle overloads but not positive half-cycle overloads.

FIG. 3 is a schematic diagram of another embodiment of the invention which trips on both positive and negative half-cycle overloads. This embodiment combines two of the half-cycle circuits of FIG. 2.

The above described embodiments of FIGS. 1 - 3 have the primary coil 4 acting in the circuit only when the switch 1 is closed. The coil 4 can be connected such that it operates with the switch 1 open. This modification involves a re-connection of primary coil 4 so that the resistors 7 and 8 are connected across the switch 1 only; not the primary coil 4. Coil 4 is connected between the power supply and the connection of resistor 7 and reed contact 6.

Another modification to the embodiment of FIG. 1 requires the connection of a diode 10 or other non-linear device in series with secondary coil winding 3; neither diode 9 nor magnet 11 are used. The series connected diode serves to modify the secondary coil flux characteristics.

Though described in connection with a reed switch, it is to be understood that an electro-mechanical switching device may be substituted for the reed switch in the manner taught by our aforementioned copending application.

As modifications to the foregoing may be made without departing from the spirit and scope of my invention, what is sought to be protected is set forth in the appended claims.

We claim:

1. A automatically resetting circuit protector comprising:

a first terminal for connecting said protector to a power source; a second terminal for connecting said protector to a load; magnetic switching means having two moveable elements; a primary electromagnetic coil winding connected in series with one of said moveable elements and said first terminal; a secondary electromagnetic coil winding connected to said load and to said second terminal; a first resistance connected between said first terminal and said secondary coil; a second resistance connected between said second terminal and said secondary coil; said secondary electromagnetic coil causing said moveable elements to close as a function of the voltage level to said load.

2. The protector of claim 1 wherein said coil windings are of opposite polarity.

3. The protector of claim 1 further including a diode across said primary electromagnetic coil for limiting the voltage drop across said primary coil.

4. A magnetically operated circuit protector comprising an first input terminal and a second output terminal; switching means having at least two moveable contacts connected between said first and second terminals; a first electromagnetic coil connected to one of said moveable contacts and to said input terminal; a second electromagnetic coil connected to said output terminal; said second coil causing the closing of said contacts as a function of voltage at said output terminal; and said first and second coils causing said contacts to open as the current at said load increases.

5. A circuit protector comprising an input terminal and an output terminal, a reed switch having two elements connected between said input terminal and said output terminal, a first coil connected between said input terminal and one of said elements; a second coil connected to said output terminal; said second coil causing the closing of said elements as a function of voltage at said output terminal; and magnetic bias means located in proximity to said switch for maintaining said elements in a closed position until the occurrence of a predetermined condition said first and second coils causing said contacts to open as the current at said load increases.

6. The device of claim 5 wherein said coils encircle said reed switch.

7. A circuit protector comprising: an electromechanical switching device, a primary coil connected in series with said switching device, first and second resistors connected across said switching device and said primary coil; a secondary coil connected at a junction of said two resistors for generating a flux as a function of a condition of a load; whereby said switching device 4 is open when there is no power supplied and closed when the load reaches a predetermined percentage of its full level.

* * * * *